United States Patent
Iesaki (10) Patent No.: US 8,680,797 B2
(45) Date of Patent: Mar. 25, 2014

(54) MOTOR CONTROL DEVICE

(75) Inventor: Kenichi Iesaki, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 311 days.

(21) Appl. No.: 13/239,583

(22) Filed: Sep. 22, 2011

(65) Prior Publication Data

US 2012/0081063 A1    Apr. 5, 2012

(30) Foreign Application Priority Data

Sep. 30, 2010   (JP) ................. 2010-221040

(51) Int. Cl.
  *G05D 13/00*   (2006.01)
  *G05B 11/01*   (2006.01)
(52) U.S. Cl.
  USPC ............ 318/162; 318/400.19; 388/904
(58) Field of Classification Search
  USPC ........... 318/162, 163, 164, 400.12, 400.19, 318/448, 456, 611, 651, 702; 388/904
  See application file for complete search history.

(56) References Cited

U.S. PATENT DOCUMENTS

| | | | |
|---|---|---|---|
| 4,982,816 A | | 1/1991 | Doi et al. |
| 5,980,139 A | * | 11/1999 | Chapman et al. ............. 400/582 |
| 6,102,591 A | * | 8/2000 | Chapman et al. ............... 400/76 |
| 6,140,791 A | * | 10/2000 | Zhang .......................... 318/632 |
| 6,549,364 B1 | * | 4/2003 | Shih ........................... 360/78.06 |
| 7,462,998 B2 | * | 12/2008 | Akiyama ...................... 318/162 |
| 2005/0162111 A1 | | 7/2005 | Tsutsui |
| 2006/0279241 A1 | | 12/2006 | Tsutsui et al. |

FOREIGN PATENT DOCUMENTS

| | | |
|---|---|---|
| JP | 01-268479 A | 10/1989 |
| JP | 06-218782 A | 8/1994 |
| JP | 08-179833 A | 7/1996 |
| JP | 11-053021 A | 2/1999 |
| JP | 2000-188894 A | 7/2000 |
| JP | 2008-217405 | 9/2008 |
| JP | 2008-217410 | 9/2008 |
| WO | 03-085816 | 10/2003 |
| WO | 2005-122385 | 12/2005 |

\* cited by examiner

*Primary Examiner* — Bentsu Ro
(74) *Attorney, Agent, or Firm* — Banner & Witcoff, Ltd.

(57) ABSTRACT

A motor control device comprises: an acceleration upper limit estimating unit; a target acceleration setting unit; a motor control unit; and a deficit calculating unit, wherein the target acceleration setting unit corrects the target acceleration based on the acceleration profile by an amount corresponding to the acceleration deficit within a range in which the target acceleration does not exceed the acceleration upper limit on the basis of the acceleration deficit calculated by the deficit calculating unit to set the target acceleration at each time.

6 Claims, 4 Drawing Sheets

MOTOR CONTROL DEVICE

CROSS REFERENCE TO RELATED APPLICATION

The present application claims priority from Japanese Patent Application No. 2010-221040, which was filed on Sep. 30, 2010, the disclosure of which is herein incorporated by reference in its entirety.

TECHNICAL FIELD

The present invention relates to a motor control device.

BACKGROUND

In the related art, as a motor control device, a device is known in which an addition value of a driving current corresponding to a target acceleration and a disturbance compensation current corresponding to a disturbance estimated by a disturbance observer is input to a motor to perform robust acceleration control. As this kind of motor control device, a device is also known in which a target acceleration is limited within a predetermined range by a limiter (see Patent Document 1).

As well known in the art, in a motor, torque saturation occurs at a critical point. For this reason, when a target acceleration exceeds an acceleration upper limit due to torque saturation, if no limit is set, torque corresponding to the target acceleration is not generated, causing control to be unstabilized.

SUMMARY

Figure 4A:
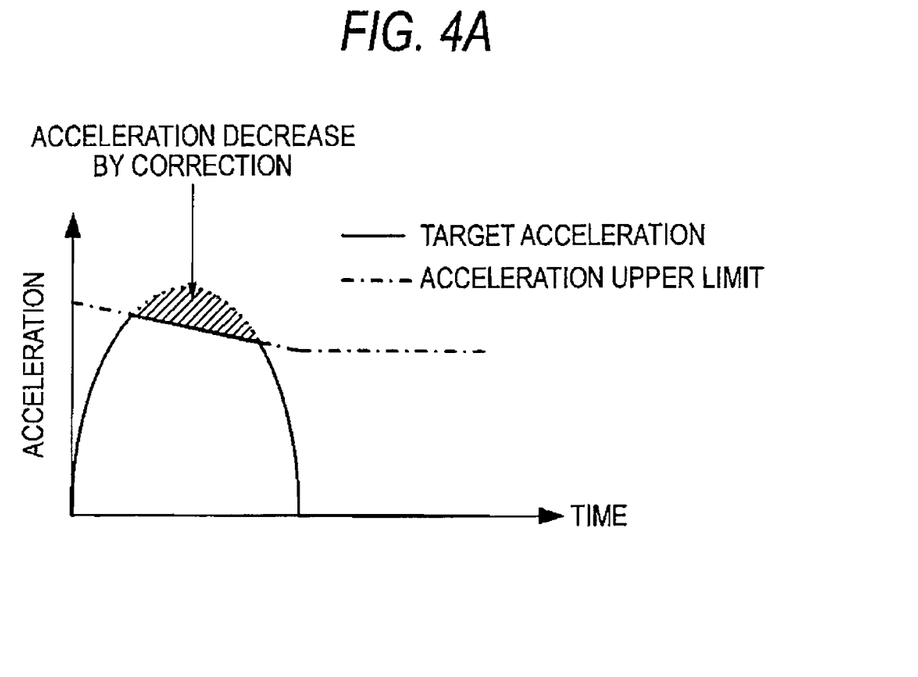
FIGS. 4A and 4B are explanatory views illustrating the related art.
Figure 4B:
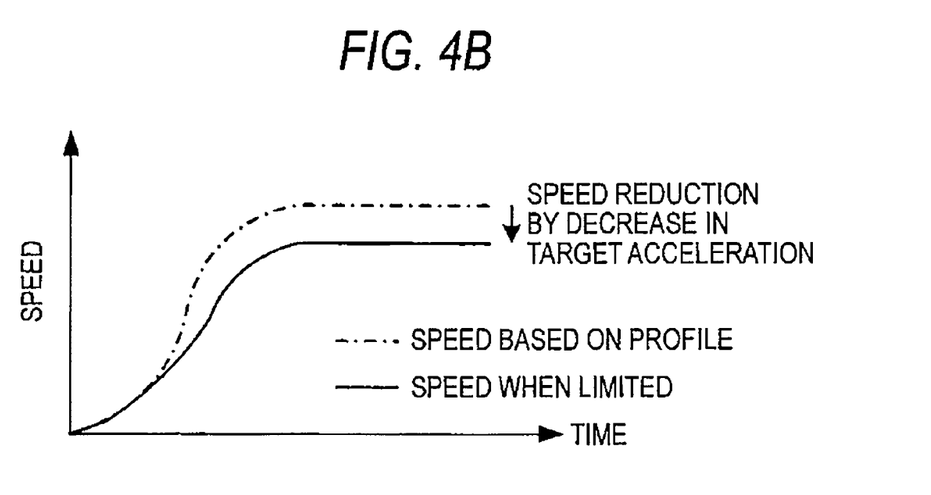

In the above-described method of the related art, when the target acceleration exceeds the acceleration upper limit, as shown in FIG. 4A, the target acceleration is corrected, such that an original target acceleration is not obtained. Thus, if the above-described technique is applied to a control process which accelerates the motor to a predetermined speed in accordance with a target profile defined in advance, as shown in FIG. 4B, it is not possible to accelerate the motor to a target speed, making it difficult to achieve the original object. FIG. 4A shows the locus of a target acceleration in a control process which accelerates the motor to a predetermined speed. In FIG. 4A, the locus of the target acceleration when the target acceleration is corrected to the acceleration upper limit is indicated by a solid line, and the locus of the target acceleration when the target acceleration is not corrected is indicated by a dotted line. In FIG. 4B, the speed locus of the motor when the target acceleration is corrected to the acceleration upper limit is indicated by a solid line, and the speed locus of the motor when the target acceleration is not corrected is indicated by a one-dot-chain line.

The invention has been finalized in consideration of the above-described problems, and an object of the invention is to provide a technique for appropriately accelerating a motor to a target speed even when correction is performed in a motor control device, which accelerates the motor to a predetermined speed in accordance with a target profile, and when torque saturation occurs, corrects the target acceleration.

In order to achieve the above-described object, a motor control device according to an aspect of the invention includes acceleration upper limit estimating unit, target acceleration setting unit, motor control unit, and deficit calculating unit. The acceleration upper limit estimating unit in the motor control device estimates an acceleration upper limit being realizable in a motor as a control target. The target acceleration setting unit sets a target acceleration at each time in accordance with an acceleration profile representing the target acceleration locus of the motor to a predetermined speed and, during a period in which a target acceleration based on the acceleration profile exceeds the acceleration upper limit estimated by the acceleration upper limit estimating unit, correcting and setting the target acceleration at each time to be equal to or lower than the acceleration upper limit estimated by the acceleration upper limit estimating unit.

The motor control unit determines a control input for the motor on the basis of the target acceleration set by the target acceleration setting unit to control the motor. The deficit calculating unit calculates a temporal integration of a difference between the target acceleration set at each time during the period, in which the target acceleration based on the acceleration profile exceeds the acceleration upper limit, and the target acceleration based on the acceleration profile as an acceleration deficit during the period when the target acceleration based on the acceleration profile exceeds the acceleration upper limit.

In this aspect of the invention, the acceleration upper limit by torque saturation is estimated, and when the target acceleration based on the acceleration profile exceeds the estimated acceleration upper limit, the target acceleration is suppressed, thereby preventing control from being unstabilized because the target acceleration which exceeds the acceleration upper limit is set. Acceleration deficiency which occurs when the target acceleration is suppressed is eliminated by correcting the target acceleration within a range without exceeding the acceleration upper limit after the period in which the target acceleration based on the acceleration profile exceeds the acceleration upper limit has ended.

According to the aspect of the invention, it is possible to solve the problem in that the target acceleration is limited and acceleration to a target speed cannot be performed, and to avoid control from being unstabilized due to torque saturation, thereby appropriately accelerating the motor to a target speed.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, an example of the invention will be described with reference to the drawings.

Figure 1:
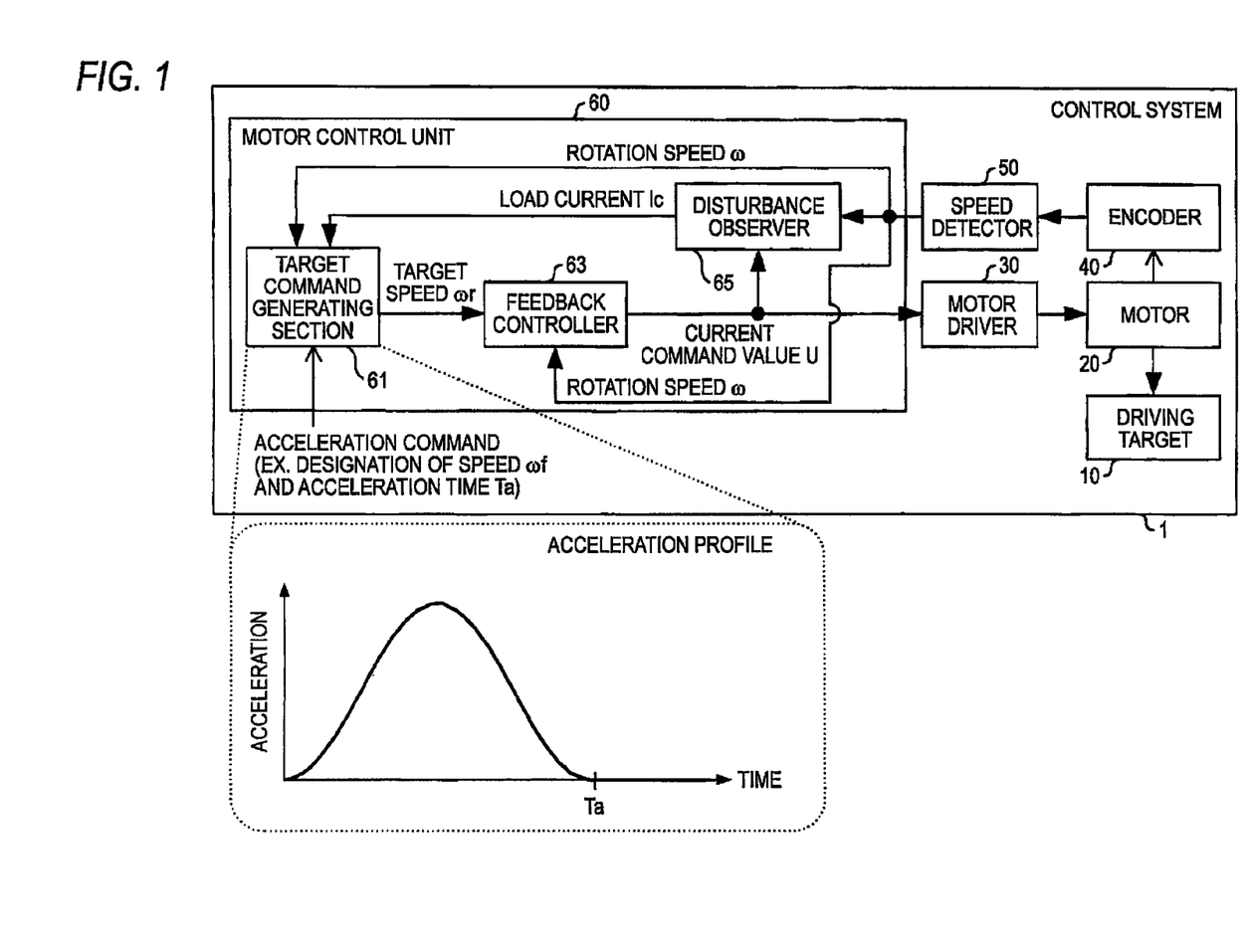
FIG. 1 is a block diagram showing the configuration of a control system 1.

As shown in FIG. 1, a control system 1 of this example includes a motor (DC motor) 20 which drives a driving object 10, a motor driver 30, a rotary encoder 40 which is connected to the rotation shaft of the motor 20, a speed detector 50 which detects the rotation speed ω of the motor on the basis of an output signal of the rotary encoder 40, and a motor control unit 60 which calculates a control input (manipulation amount) for the motor 20.

The control system 1 is incorporated into an electrical apparatus, such as an image forming apparatus or an image reading apparatus, and performs motor control in accordance with a command input from a control unit (main microcomputer or the like) of the electrical apparatus. When the electrical apparatus is an image forming apparatus as represented by an ink jet printer in which a recording head is conveyed in a main scanning direction and a sheet is conveyed in a sub scanning direction to form an image on the sheet, the driving object 10 may be a conveying mechanism of a carriage in which the recording head is mounted, a sheet conveying mechanism, or the like. When the electrical apparatus is a flatbed image reading apparatus in which a line sensor is conveyed to read a document on a platen, the driving object 10 may be a conveying mechanism of the line sensor. When the electrical apparatus is an automatic document feeder (ADF) image reading apparatus, the driving object 10 may be a document conveying mechanism which conveys the document to be read.

The motor driver 30 in the control system 1 inputs a driving current corresponding to a current command value U to the motor 20 on the basis of the current command value U input from the motor control unit 60 to drive the motor 20. The current command value U corresponds to a control input for the motor 20.

The rotary encoder 40 is configured as known in the art, and outputs a pulse signal each time the motor 20 rotates by a predetermined amount. Specifically, the rotary encoder 40 outputs an A-phase signal and a B-phase signal, which are different in phase by $\pi/2$, as a pulse signal. The speed detector 50 detects the rotation speed $\omega$ of the motor 20 on the basis of the A-phase signal and the B-phase signal output from the rotary encoder 40, and inputs the rotation speed $\omega$ to the motor control unit 60.

The motor control unit 60 includes a target command generating section 61, a feedback controller 63, and a disturbance observer 65.

The target command generating section 61 sets a target acceleration at each time in accordance with an acceleration profile set in advance, sets a target speed $\omega r$ at each time corresponding to the target acceleration, and inputs the target speed $\omega r$ to the feedback controller 63.

The feedback controller 63 calculates a deviation $e=\omega r-\omega$ between the target speed $\omega r$ and the rotation speed $\omega$ on the basis of the target speed $\omega r$ input from the target command generating section 61 and the rotation speed $\omega$ of the motor 20 input from the speed detector 50, and calculates a current command value U corresponding to the deviation e. That is, the deviation e is input to a predetermined transfer function defined in the design phase in accordance with the plant characteristics to calculate the current command value U.

The disturbance observer 65 estimates a disturbance on the basis of the current command value U output from the feedback controller 63 and the rotation speed $\omega$ of the motor 20 input from the speed detector 50, and outputs information of a load current Ic (a motor current at a point where load torque by a disturbance and motor torque are balanced) as a disturbance estimated value. The above-described function of the disturbance observer 65 is general, thus detailed description thereof will be omitted.

Information of the load current Ic output from the disturbance observer 65 and the target command generating section 61 and information of the rotation speed $\omega$ of the motor 20 output from the speed detector 50 are input to the target command generating section 61. The target command generating section 61 of this example estimates an acceleration upper limit Am of the motor 20 on the basis of these kinds of information. The acceleration upper limit Am can be estimated by the following expression using the rotation speed $\omega$ of the motor 20 and the load current Ic.

[Equation 1]

$$A_m = \frac{K_t}{J_n \cdot R_n}(V_m - R_n I_c - K_e \omega) \qquad (1)$$

Kt is a torque constant of the motor 20, Jn is load inertia, and Rn is armature resistance. Vm is a rated voltage of the motor 20, and Ke is a back electromotive force constant. Kt, Jn, Rn, Vm, and Ke are derived in advance in the design phase and set in the target command generating section 61. That is, the target command generating section 61 estimates the acceleration upper limit Am by the expression (1) on the basis of Kt, Jn, Rn, Vm, and Ke set in advance and information of the time-varying load current Ic and the rotation speed $\omega$ of the motor 20.

The first term Kt·Vm/(Jn·Rn) of the expression (1) represents an acceleration upper limit by the rated voltage Vm, the second term Kt·Ic/Jn represents a decrease in the acceleration upper limit by the load current Ic, and the third term Kt·Ke·$\omega$/(Jn·Rn) represents a decrease in the acceleration upper limit due to a current decrease by back electromotive force.

Subsequently, description will be provided as to the detailed configuration of the target command generating section 61 which estimates the acceleration upper limit Am.

Figure 2A:
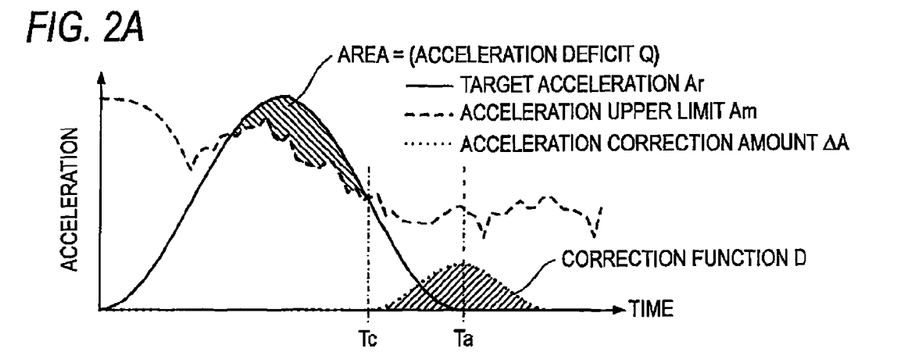
FIGS. 2A 2B and 2C are explanatory views illustrating correction of a target acceleration Ar.

If an acceleration command is input from the outside (the main microcomputer of the electrical apparatus, or the like), the target command generating section 61 generates (sets) an acceleration profile, which represents a target acceleration locus from a speed zero to a speed $\omega f$ indicated by a solid line in the lower part of FIG. 1 and FIG. 2A, on the basis of information of a speed $\omega f$ and an acceleration time Ta designated along with the acceleration command. The speed $\omega f$ is a speed when acceleration ends, and the acceleration time Ta is an acceleration time from the speed zero to the speed $\omega f$.

The acceleration profile is generated as a function in which time-series data of a target acceleration or an input variable is time t, and an output variable is the target acceleration Ar. In generating a function as the acceleration profile, for example, the target command generating section 61 determines the design variables of a predetermined function (for example, a trigonometric function) with undetermined design variables on the basis of information of the speed $\omega f$ and the acceleration time Ta designated along with the acceleration command to generate (set) a function representing a target acceleration locus adjusted to the speed $\omega f$ and the acceleration time Ta. Specifically, in this example, an acceleration profile is generated which represents a single-peaked target acceleration locus such that a temporal differentiation of the acceleration Ar at the time t=0 and the time t=Ta is zero, the acceleration Ar at the time t=Ta/2 has a maximum value, the acceleration Ar monotonically increases from the time t=0 to the time t=Ta/2, and the acceleration monotonically decreases from the time t=Ta/2 to the time t=Ta.

Figure 2B:
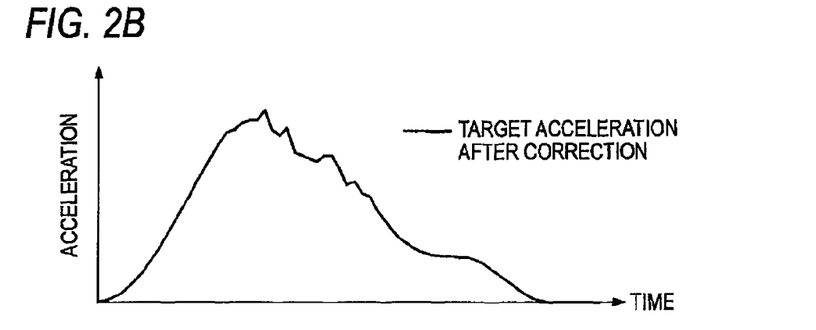

At the time of controlling the motor 20 on that basis of the acceleration profile, the target command generating section 61 of this example calculates the acceleration upper limit Am in accordance with the above-described expression (1) and corrects the target acceleration Ar. FIG. 2A is a graph in which the target acceleration Ar at each time t based on the acceleration profile is indicated by a solid line, and an example of the acceleration upper limit Am is indicated by a broken line. According to the example shown in FIG. 2A, the target acceleration Ar exceeds the acceleration upper limit Am in the perimeter of a point where the target acceleration Ar based on the acceleration profile is maximized. At this time, as shown in FIG. 2B, the target command generating section 61 corrects the target acceleration Ar to the acceleration upper limit Am. FIG. 28 is a graph showing a target acceleration after correction. That is, in this example, during a period in which the target acceleration Ar based on the acceleration profile exceeds the acceleration upper limit Am, motor control is performed on the basis of the target acceleration Ac=Am after correction.

However, if the target acceleration Ar based on the acceleration profile is limited to the acceleration upper limit Am, as shown in FIG. 48, the motor 20 cannot be accelerated to the speed ωf at the time of the end of acceleration defined by the acceleration profile. Thus, after the period in which the target acceleration Ar based on the acceleration profile exceeds the acceleration upper limit Am has ended, the target command generating section 61 corrects the target acceleration Ar based on the acceleration profile in accordance with a correction function D(t) set at the time of the end of the period to compensate for acceleration deficiency because the target acceleration Ar is limited to the acceleration upper limit Am, such that the rotation speed ω of the motor 20 after acceleration ends reaches the speed ωf. A dotted line shown in FIG. 2A indicates the locus of a correction amount ΔA defined by the correction function D(t).

Specifically, in this example, the correction function D(t) is set such that a temporal integration (a filled region of FIG. 2A) of the correction function D(t) is identical to a temporal integration of the difference (Ar−Am) between the target acceleration Ar during the period, in which the target acceleration Ar exceeds the acceleration upper limit Am, and the acceleration upper limit Am. At this time, the correction function D(t) is set such that the correction amount ΔA is maximized at the original acceleration end time t=Ta represented by the acceleration profile, the correction amount ΔA monotonically increases from the end time t=Tc of the during the period, in which the target acceleration Ar based on the acceleration profile exceeds the target acceleration Am, to the time t=Ta, and the correction amount ΔA monotonically decreases from the time t=Ta to the correction end time. Thus, the target acceleration Ac=Ar+ΔA after correction by the correction amount ΔA does not exceed the acceleration upper limit Am.

For example, the target command generating section 61 sets the correction function D(t) represented in the following expression on the basis of information of an acceleration deficit Q, which is the temporal integration of the difference (Ar−Am) between the target acceleration Ar during the period, in which the target acceleration Ar based on the acceleration profile exceeds the acceleration upper limit Am, and the acceleration upper limit Am, and information of the time Ta and Tc.

[Equation 2]

$$\Delta A = D(t) = -\frac{Q}{2(T_a - T_c)}\cos\left\{\frac{\pi}{T_a - T_c}(t - T_c)\right\} + \frac{Q}{2(T_a - T_c)} \quad (2)$$

Here, the correction function D(t) is set only in a time interval Tc≤t≤Tc+2·(Ta−Tc). That is, the correction function D(t)=0 is addressed in a different time zone.

In this example, after the period in which the target acceleration Ar based on the acceleration profile exceeds the acceleration upper limit Am ends, the target command generating section 61 corrects the target acceleration Ar based on the acceleration profile to Ar+ΔA in accordance with the above-described expression (2). The feedback controller 63 performs motor control on the basis of the target acceleration Ac=Ar+ΔA after correction, such that the rotation speed ω of the motor 20 after acceleration ends reaches the speed ωf.

The correction function D(t) represented by the expression (2) does not guarantee that the target acceleration Ac after correction does not exceed the acceleration upper limit Am. However, acceleration deficiency is not generated so much unless the acceleration profile is appropriately set. Substantially, with correction by the correction function D(t) based on the expression (2), there is no case where the target acceleration Ac after correction exceeds the acceleration upper limit Am. Similarly to the expression (2), it is all the more effective if the acceleration profile is defined by a cosine function.

Figure 2C:
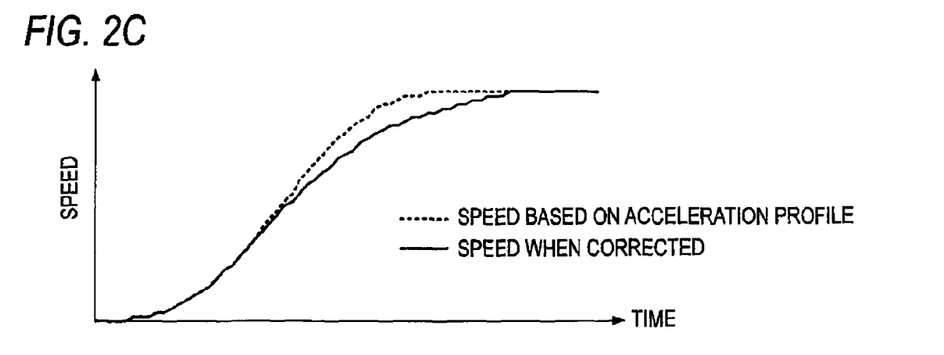

FIG. 2C is a graph showing the speed locus of the motor 20 when the target acceleration Ar exceeds the acceleration upper limit Am and the above-described correction is performed. In FIG. 2C, the speed locus of the motor 20 when the target acceleration Ar does not exceed the acceleration upper limit Am is indicated by a dotted line. The motor control unit 60 of this example performs motor control described as above, and even when the target acceleration Ar exceeds the acceleration upper limit Am, appropriately corrects the target acceleration Ar, such that the speed when acceleration ends becomes the originally designated speed ωf.

Subsequently, processing which is performed by the target command generating section 61 will be described with reference to FIG. 3. If an acceleration command is input, as described above, the target command generating section 61 generates (sets) the acceleration profile representing the target acceleration locus to the speed ωf on the basis of the speed ωf and the acceleration time Ta designated by the acceleration command. Thereafter, acceleration control processing shown in FIG. 3 is performed.

Figure 3:
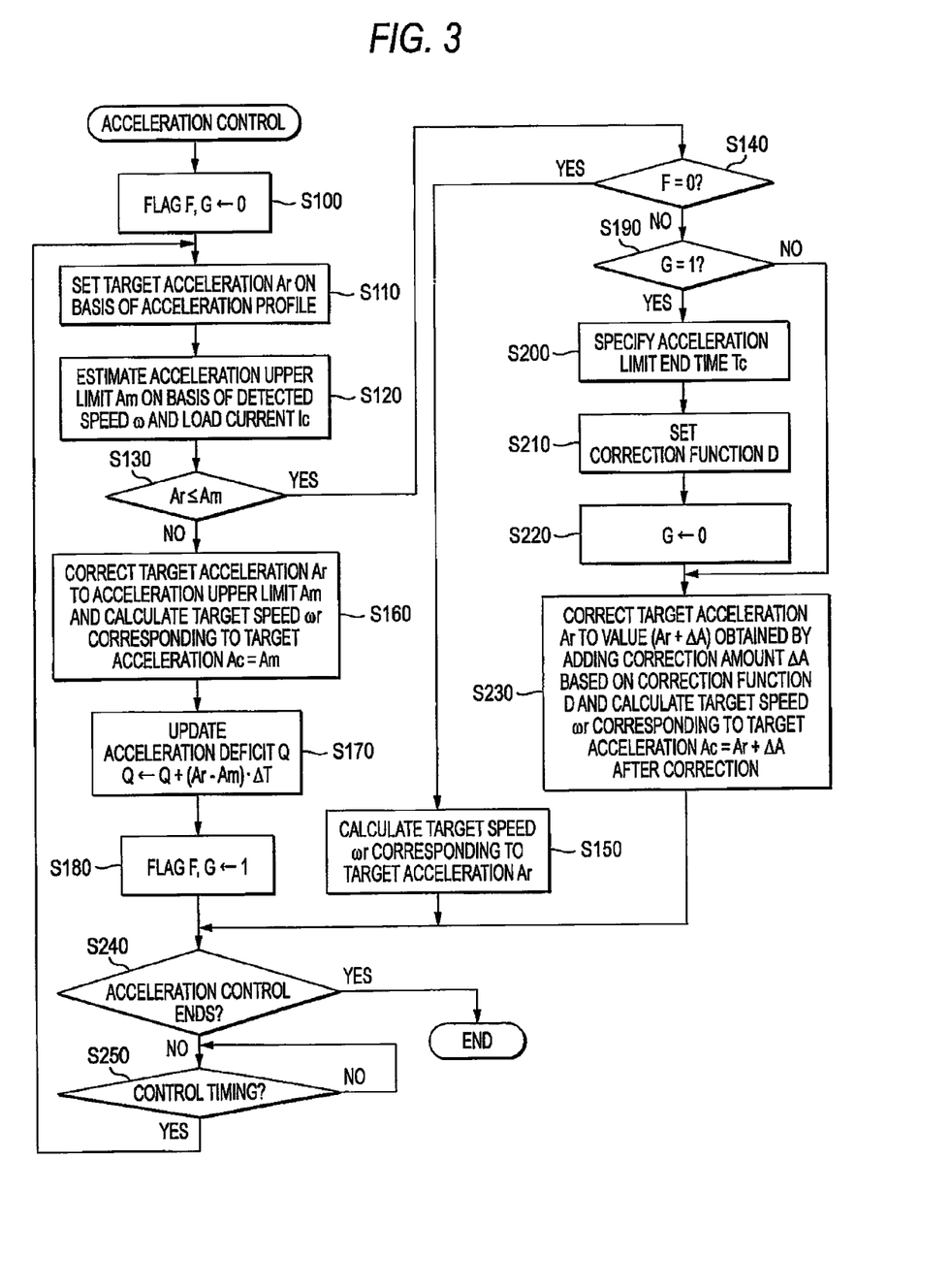
FIG. 3 is a flowchart showing acceleration control processing which is performed by a target command generating section 61.

If the acceleration control processing shown in FIG. 3 starts, the target command generating section 61 initializes flags F and G to zero (S100), progresses the process to S110, and sets the target acceleration Ar corresponding to a current time t on the basis of the acceleration profile. The acceleration upper limit Am is estimated in accordance with the above-described expression (1) on the basis of the rotation speed ω of the motor 20 at the current time t input from the speed detector 50 and the load current Ic at the current time input from the disturbance observer 65 (S120).

Thereafter, the target command generating section 61 determines whether or not the target acceleration Ar at the current time t is equal to or smaller than the acceleration upper limit Am (S130). When the target acceleration Ar is equal to or smaller than the acceleration upper limit (Yes in S130), it is determined whether or not the value of the flag F is 0 (S140). The flag F is updated to a value 1 when the target acceleration Ar based on the acceleration profile exceeds the acceleration upper limit Am (see S180).

Thus, in the early period of acceleration, the target command generating section 61 determines that the value of the flag F is 0 (Yes in S140), and calculates the target speed ωr corresponding to the target acceleration Ar on the basis of the target acceleration Ar set in S110. The target speed ωr is input to the feedback controller 63 (S150).

Specifically, when a control cycle (a calculation cycle of the target speed ωr) is ΔT, a value which is obtained by adding Ar·ΔT to the previous rotation speed ω0 is calculated as the target speed ωr corresponding to the current target acceleration Ar. That is, the temporal integration of the target acceleration from when acceleration control starts is calculated as the target speed ωr.

The feedback controller 63 calculates the current command value U on the basis of the deviation e between the target speed ωr calculated in the above-described manner and the rotation speed ω of the motor 20 input from the speed detector 50. The motor driver 30 drives the motor 20 on the basis of the current command value U input from the feedback controller 63. With this operation, the control system 1 of this example controls the motor 20 such that the rotation speed ω of the motor 20 follows the target speed ωr.

After the processing of S150, the target command generating section 61 determines whether or not an acceleration control ending condition is satisfied (Yes in S240). When the ending condition is not satisfied (No in S240), it is waits for the time corresponding to the control cycle ΔT on the basis of the time by a timer (not shown) or the like (S250). Thus, it waits until the next control timing comes.

If the next control timing comes (Yes in S250), the process progresses to S110, and the target acceleration Ar corresponding to the current time t is calculated. The acceleration upper limit Am corresponding to the current time t is also estimated on the basis of the latest rotation speed ω input from the speed detector 50 and the latest load current Ic input from the disturbance observer 65 (S120), and the processing of S130 and later is performed on the basis of the estimation result.

If the target acceleration Ar based on the acceleration profile exceeds the acceleration upper limit Am (No in S130), the target acceleration Ar is corrected to the acceleration upper limit Am to calculate the target speed ωr corresponding to the target acceleration Ac=Am after correction, and the calculated target speed ωr is input to the feedback controller 63 (S160). A method which calculates the target speed ωr from the target acceleration Ac is as described in S150.

Meanwhile, when the target acceleration is limited to the acceleration upper limit Am, acceleration deficiency occurs. For this reason, in this example, in S170, the difference Ea=Ar−Am between the target acceleration Ar and the acceleration upper limit Am is calculated, and the acceleration deficit Q is updated on the basis of the difference Ea. Specifically, in S170, the acceleration deficit Q is updated from a previous value to a value which is obtained by adding (Ar−Am)·ΔT. With this operation, in this example, the temporal integration of the difference Ea during a period in which the target acceleration Ar is corrected to the acceleration upper limit Am is calculated as the acceleration deficit Q. Thereafter, the target command generating section 61 updates the flags F and G to the value 1 (S180).

After the processing of S180, it is determined whether or not the acceleration control ending condition is satisfied. When the ending condition is not satisfied (No in S240), it waits until the time corresponding to the control cycle ΔT elapses (S250), the process progresses to S110, and the above-described processing is performed. If the period in which the target acceleration Ar exceeds the acceleration upper limit Am ends (Yes in S130), since the flag F=1 is set, the determination result in S140 is negative, and the process progresses to S190.

If the process progresses to S190, the target command generating section 61 determines whether or not the value of the flag G is 1. The flag G is a flag which is set to perform the processing of S200 and S210 once only after the period in which the target acceleration Ar exceeds the acceleration upper limit Am ends. After the processing corresponding to S200 and S210 is performed, the flag G is initialized to the value 0 (see S220).

That is, after the period in which the target acceleration Ar exceeds the acceleration upper limit Am, in first S190, the target command generating section 61 positively determines that the value of the flag G is 1, and progresses the process to S200.

If the process progresses to S200, the target command generating section 61 sets the acceleration limit end time Tc, which is the end time of the period in which the target acceleration Ar exceeds the acceleration upper limit Am, to a value corresponding to the current time t, and thereafter, sets the correction function D(t) in accordance with the above-described expression (2) on the basis of the acceleration limit end time Tc and the acceleration end time Ta, and the acceleration deficit Q at that time (S210). Thereafter, the process progresses to S220, and the flag G is reset to the value 0.

Thereafter, the target command generating section 61 corrects the target acceleration Ar to the value (Ar+ΔA) obtained by adding the correction amount ΔA on the basis of the correction amount ΔA at the current time t calculated from the correction function D(t). Then, the target speed ωr corresponding to the target acceleration Ac=Ar+ΔA after correction is calculated and input to the feedback controller 63 (S230). A method which calculates the target speed ωr from the target acceleration Ac is as described above.

In this way, in this example, the target acceleration Ar based on the acceleration profile is corrected to increase from the end time t=Tc of the period in which the target acceleration Ar exceeds the acceleration upper limit Am, and the motor 20 is controlled to compensate for acceleration deficiency during the period in which the target acceleration Ar exceeds the acceleration upper limit Am.

That is, if the processing of S230 ends, the target command generating section 61 determines whether or not the acceleration control ending condition is satisfied. When the ending condition is not satisfied (No in S240), it waits until the time corresponding to the control cycle ΔT elapses (S250), and the process progresses to S110. In the subsequent processing, the determination result in S130 is positive, the determination result in S140 is negative, and the determination result in S190 is negative. Thus, the process progresses to S230, and processing is performed in which the target acceleration Ar is corrected in accordance with the correction function D(t) set in S210 immediately after the period in which the target acceleration Ar exceeds the acceleration upper limit Am ends, and the target speed ωr corresponding to the target acceleration Ac=Ar+ΔA after correction is input to the feedback controller 63. If the acceleration control ending condition is satisfied (Yes in S240), the acceleration control processing ends.

The processing of S240 will be described in detail. When the flag F=0, this means that the target acceleration Ar does not exceed the acceleration upper limit Am. Thus, it is determined that the acceleration control ending condition is satisfied on the basis of the time by a timer (not shown) or the like when the acceleration end time t=Ta based on the acceleration profile comes (Yes in S240), and the acceleration control processing ends. When the flag F=1, this means that the target acceleration Ar exceeds the acceleration upper limit Am. Thus, it is determined that the acceleration control ending time is satisfied when the correction end time t=Tc+2·(Ta−

Tc) of the target acceleration Ar based on the correction function D(t) comes (Yes in S240), and the acceleration control processing ends.

Although the configuration of the control system 1 of this example has been described, according to this example, during the period in which the target acceleration Ar based on the acceleration profile exceeds the acceleration upper limit Am, the target acceleration Ar at each time is corrected to the acceleration upper limit Am. The temporal integration of the difference between the target acceleration Ac set at each time during the period, in which the target acceleration Ar based on the acceleration profile exceeds the acceleration upper limit Am, and the target acceleration Ar based on the acceleration profile is calculated as the acceleration deficit Q. After the period in which the target acceleration Ar based on the acceleration profile exceeds the acceleration upper limit Am ends, the target acceleration Ar is corrected by an amount corresponding to the acceleration deficit Q to set the target acceleration Ac at each time.

According to the control system 1 of this example, it is possible to prevent control from being unstabilized because the target acceleration Ar which exceeds the acceleration upper limit Am is set, and to solve the problem in that the target acceleration is limited to the acceleration upper limit Am and the motor 20 cannot be accelerated to the target speed ωf. That is, according to this example, it is possible to avoid control from being unstabilized due to torque saturation, making it possible to appropriately accelerating the motor 20 to the target speed ωf.

As a result, if the control system 1 is applied to, for example, a system which controls a sheet conveying mechanism, it is possible to prevent sheet conveying throughput from being degraded due to acceleration deficiency when the target acceleration Ar is suppressed to the acceleration upper limit Am. If the control system 1 is applied to a system which controls a carriage conveying mechanism, it is possible to appropriately convey a carriage constantly at the target speed ωf after acceleration.

In particular, according to this example, the acceleration upper limit Am is estimated taking into consideration a decrease in the acceleration upper limit caused by back electromotive force and a decrease in the acceleration upper limit caused by a disturbance. Therefore, it is possible to estimate the acceleration upper limit Am with high precision, and to prevent control from being unstabilized, thereby realizing high-precision motor control.

According to this example, after the period in which the target acceleration Ar based on the acceleration profile exceeds the acceleration upper limit Am ends, the target acceleration Ar is corrected in accordance with the function D(t) represented in the above-described expression (2) in which the correction amount ΔA is maximized when the target acceleration Ar based on the acceleration profile becomes zero. Therefore, there is no case that the target acceleration Ac after correction substantially exceeds the acceleration upper limit Am, and it is possible to perform correction such that the temporal integration of the correction amount ΔA is identical to the acceleration deficit Q and to appropriately compensate for acceleration deficiency, making it possible to appropriately accelerate the motor 20 to the designated speed ωf.

Although the example of the invention has been described, the processing of S120 which is performed by the target command generating section 61 of this example corresponds to an example of processing which is realized by acceleration upper limit estimating unit of the invention. The processing of S110, S130, S140, S150, S160, S180, S190 to S230, S240, and S250 which are performed by the target command generating section 61 corresponds to an example of processing which is realized by target acceleration setting unit of the invention.

The operation of the target command generating section 61 which sets the target speed ωr on the basis of the target acceleration Ar and Ac (S150, S160, S230), and the operation of the feedback controller 63 which calculates the current command value U based on the target speed ωr corresponds to an example of the operation of the target acceleration setting unit which determines the control input for the motor on the basis of the target acceleration set by the target acceleration setting unit. The processing of S170 which is performed by the target command generating section 61 corresponds to an example of processing which is realized by deficit calculating unit of the invention.

The invention is not limited to the foregoing example and may be modified in various forms. For example, the control system 1 can be applied to various electrical apparatuses other than an image forming apparatus or an image reading apparatus. That is, the invention has a feature from the viewpoint of control when the motor 20 is accelerated to a predetermined speed ωf, and can be applied in various fields insofar as the control system is used for this kind of control.

Although in this example, a configuration has been described in which the acceleration upper limit Am is estimated on the basis of information of the load current Ic output from the disturbance observer 65, information of the rotation speed ω of the motor 20 output from the speed detector 50, and the parameters set in advance, the acceleration upper limit Am may be estimated on the basis of the value of a detector which directly detects the decrease in the acceleration upper limit caused by the load current Ic or a current decrease caused by back electromotive force.

The correction function D(t) is not limited as being set as in this example, and may be of course set by a function which has no relation to the end time Tc of the period in which the target acceleration Ar exceeds the acceleration upper limit and the original acceleration end time Ta represented by the acceleration profile. The correction of the target acceleration by the correction function D(t) may be performed after the period in which the target acceleration Ar exceeds the acceleration upper limit Am ends.

What is claimed is:
1. A motor control device comprising:
an acceleration upper limit estimating unit configured to estimate an acceleration upper limit that is realizable in a motor as a control target;
a target acceleration setting unit configured to set a target acceleration at each time in accordance with an acceleration profile representing a target acceleration locus of the motor to a predetermined speed, the target acceleration setting unit configured to, during a period in which the target acceleration based on the acceleration profile exceeds the acceleration upper limit estimated by the acceleration upper limit estimating unit, correct and set the target acceleration at each time to be equal to or lower than the acceleration upper limit estimated by the acceleration upper limit estimating unit;
a motor control unit configured to determine a control input for the motor on the basis of the target acceleration set by the target acceleration setting unit to control the motor; and a deficit calculating unit configured to, when the target acceleration based on the acceleration profile exceeds the acceleration upper limit, calculate a temporal integration of a difference between the target acceleration set at each time during the period, in which the target acceleration based on the acceleration profile exceeds the acceleration upper limit, and the target acceleration based on the acceleration profile as an acceleration deficit during the period, wherein, after the period has ended, the target acceleration setting unit corrects the target acceleration based on the acceleration profile by an amount corresponding to the acceleration deficit within a range in which the target acceleration does not exceed the acceleration upper limit on the basis of the acceleration deficit calculated by the deficit calculating unit to set the target acceleration at each time.

2. The motor control device according to claim 1, wherein from when the period has ended to correct the target acceleration based on the acceleration profile, the target acceleration setting unit gradually increases a correction amount in accordance with a predetermined function, in which the correction amount is maximized when the temporal integration of the correction amount is identical to the acceleration deficit and when the target acceleration based on the acceleration profile is zero and which has the correction amount as an output variable, and after the target acceleration based on the target acceleration profile has been zero to correct the target acceleration, the target acceleration setting unit gradually decreases the correction amount thereby correcting the target acceleration based on the acceleration profile by the amount corresponding to the acceleration deficit to set the target acceleration at each time.

3. The motor control device according to claim 2, wherein the target acceleration setting unit corrects the target acceleration in accordance with the predetermined function defined by a trigonometric function.

4. The motor control device according to claim 1, further comprising:

a disturbance observer which estimates a disturbance on the basis of the control input for the motor and a control output for the control input, wherein the acceleration upper limit estimating unit estimates the acceleration upper limit of the motor on the basis of the disturbance estimated by the disturbance observer.

5. The motor control device according to claim 4, wherein the acceleration upper limit estimating unit is configured to estimate the acceleration upper limit of the motor taking into consideration a decrease in the acceleration upper limit caused by back electromotive force and a decrease in the acceleration upper limit caused by the disturbance, estimates the decrease in the acceleration upper limit caused by the back electromotive force on the basis of a rotation speed of the motor obtained from a measuring instrument, and estimates the decrease in the acceleration upper limit caused by the disturbance on the basis of the disturbance estimated by the disturbance observer.

6. The motor control device according to claim 1, wherein the motor control unit is configured to determine the control input for the motor on the basis of a deviation between a target speed derived from the target acceleration set by the target acceleration setting unit and a rotation speed of the motor measured by a measuring instrument to control the motor.

* * * * *